US010291132B2

(12) United States Patent
Kok et al.

(10) Patent No.: US 10,291,132 B2
(45) Date of Patent: May 14, 2019

(54) INTEGRATED CIRCUIT WITH SELECTION BETWEEN PRIMARY SIDE VOLTAGE REGULATION AND SECONDARY SIDE VOLTAGE REGULATION

(71) Applicant: Infineon Technologies Austria AG, Villach (AT)

(72) Inventors: Siu Kam Kok, Singapore (SG); Tuck Meng Chan, Singapore (SG); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 241 days.

(21) Appl. No.: 14/578,848

(22) Filed: Dec. 22, 2014

(65) Prior Publication Data

US 2016/0181928 A1 Jun. 23, 2016

(51) Int. Cl.
*H02M 3/335* (2006.01)
*H02M 1/00* (2006.01)

(52) U.S. Cl.
CPC .................. *H02M 3/33523* (2013.01); *H02M 2001/0025* (2013.01); *H02M 2001/0032* (2013.01); *Y02B 70/16* (2013.01)

(58) Field of Classification Search
CPC ............. H02M 3/335; H02M 3/33569; H02M 3/33538; H02M 3/33546; H02M 3/33553; H02M 3/33507; H02M 3/33515; H02M 3/33523; H02M 1/12; H02M 1/42; H02M 1/4225; H02M 1/4233; H02M 1/4241; H02M 1/4258; H02M 1/425; H02M 1/4208
See application file for complete search history.

(56) References Cited

U.S. PATENT DOCUMENTS 5,841,643 A * 11/1998 Schenkel .......... H02M 3/33507 363/21.13
6,252,783 B1 6/2001 Huh et al.
7,529,105 B1 * 5/2009 Choi ................ H02M 3/33523 363/131
7,746,672 B2 6/2010 Nishikawa
(Continued)

FOREIGN PATENT DOCUMENTS

CN 2648694 10/2004
CN 101515756 8/2009
(Continued)

OTHER PUBLICATIONS

Fairchild Semiconductor, "AN-400A Low-Power Green-Mode PWM Flyback Power Controller without Secondary Feedback," http://www.fairchildsemi.com/an/AN/AN-400A.pdf, May 29, 2008, 8 pages.
(Continued)

*Primary Examiner* — Bryan R Perez
(74) *Attorney, Agent, or Firm* — Harrity & Harrity, LLP

(57) ABSTRACT

An integrated circuit may detect a pin voltage at a selector pin. The integrated circuit may compare the pin voltage to a threshold voltage. The integrated circuit may selectively perform primary side voltage regulation or secondary side voltage regulation, to regulate a voltage supplied to an electrical load coupled to the integrated circuit, based on comparing the pin voltage and the threshold voltage.

26 Claims, 10 Drawing Sheets

(56) References Cited

U.S. PATENT DOCUMENTS

| | | | | | |
|---|---|---|---|---|---|
| 2011/0019446 | A1* | 1/2011 | Wu | H02M 3/33523 | 363/79 |
| 2011/0157922 | A1* | 6/2011 | Konecny | H02M 3/33515 | 363/21.12 |
| 2011/0255311 | A1* | 10/2011 | Hsu | H02M 3/33507 | 363/21.15 |
| 2012/0147631 | A1* | 6/2012 | Nate | H02M 3/33507 | 363/21.15 |
| 2014/0062333 | A1* | 3/2014 | Sonobe | H05B 33/0815 | 315/291 |
| 2014/0071714 | A1* | 3/2014 | Li | H02M 3/33507 | 363/16 |
| 2014/0177290 | A1* | 6/2014 | Zhang | H02M 3/33507 | 363/21.13 |
| 2016/0322911 | A1* | 11/2016 | Hou | H02M 1/08 | |

FOREIGN PATENT DOCUMENTS

| | | |
|---|---|---|
| CN | 102739057 | 10/2012 |
| CN | 103051197 | 4/2013 |
| DE | 10016859 | 11/2000 |
| DE | 102008027054 | 1/2009 |

OTHER PUBLICATIONS

Fairchild Semiconductor, "FAN302HL mWSaver PWM Controller for Low Standby Power Battery-Charger Applications," https://www.fairchildsemi.com/datasheets/FA/FAN302HL.pdf, Sep. 1, 2011, 17 pages.

Fairchild Semiconductor, "FSEZ1016A Primary-Side-Regulation PWM Integrated Power MOSFET," https://www.fairchildsemi.com/datasheets/FS/FSEZ1016A.pdf, Jan. 1, 2014, 16 pages.

* cited by examiner

INTEGRATED CIRCUIT WITH SELECTION BETWEEN PRIMARY SIDE VOLTAGE REGULATION AND SECONDARY SIDE VOLTAGE REGULATION

BACKGROUND

A power supply may refer to an electronic device that supplies electrical energy to an electrical load. A power supply may convert one form of electrical energy to another form, and may be referred to as an electric power converter. Some power supplies are discrete, stand-alone devices, while other power supplies are built into larger devices. For example, a power supply may supply power to a desktop computer, a laptop computer, a tablet computer, a mobile phone, or another type of device that requires electrical power to operate.

SUMMARY

According to some possible implementations, a device may include an integrated circuit configured to detect a pin voltage at a selector pin, compare the pin voltage to a threshold voltage, and select one of primary side voltage regulation or secondary side voltage regulation, to regulate a voltage supplied to an electrical load coupled to the integrated circuit, based on comparing the pin voltage to the threshold voltage.

According to some possible implementations, a power supply may include a converter configured to determine a first voltage at a selector pin, compare the first voltage to a second voltage, and selectively perform one of primary side voltage regulation or secondary side voltage regulation, to regulate an output voltage supplied to an electrical load, based on comparing the first voltage to the second voltage.

According to some possible implementations, a method may include determining, by a power supply circuit, a pin voltage at a pin. The method may include comparing, by the power supply circuit, the pin voltage to a threshold voltage. The method may include selectively performing, by the power supply circuit, one of primary side voltage regulation or secondary side voltage regulation, to regulate an output voltage supplied to an electrical load, based on comparing the pin voltage and the threshold voltage.

According to some possible implementations, a converter may include a first feedback circuit that provides feedback regarding a primary voltage for a primary side voltage regulation. The converter may include a second feedback circuit that provides feedback regarding a secondary voltage for a secondary side voltage regulation. The converter may include a mode selection circuit that includes a selector pin. The mode selection circuit may select a selected mode of one of a primary side voltage regulation mode or a secondary side voltage regulation mode based on a pin voltage at the selector pin. The mode selection circuit may enable one of the first feedback circuit or the second feedback circuit, and may disable a different one of the first feedback circuit or the second feedback circuit based on the selected mode.

DETAILED DESCRIPTION

The following detailed description of example implementations refers to the accompanying drawings. The same reference numbers in different drawings may identify the same or similar elements.

A power supply, such as a battery charger or adapter, may supply electrical energy to an electrical load, such as a laptop computer, a mobile phone, or the like. The power supply may include a converter to convert alternating current of a first voltage to a second voltage. The converter may include a primary winding and a secondary winding. The primary winding may include an inductor (e.g., a coil) that forms part of an electrical circuit such that changing a current in the primary winding induces a current in the secondary winding. An electrical load, such as a device to be charged by the power supply, may be connected to the secondary winding. In this way, electrical energy may be converted from a first voltage (e.g., received from a power source) to a second voltage (e.g., supplied to the electrical load).

The power supply may regulate a voltage supplied to the electrical load using primary side voltage regulation or secondary side voltage regulation. Some benefits of using primary side voltage regulation include lower standby power consumption and lower build of materials cost than secondary side voltage regulation. However, primary side voltage regulation responds more slowly than secondary side voltage regulation during fast load changes or power input changes. Further, primary side voltage regulation may control voltage with less accuracy than secondary side voltage regulation. Additionally, primary side voltage regulation is typically used for low power applications, whereas secondary side voltage regulation is typically used for high power applications. Thus, each type of voltage regulation has advantages and disadvantages as compared to the other type.

Different integrated circuits may be designed to implement primary side voltage regulation or secondary side voltage regulation. For example, an integrated circuit may implement primary side voltage regulation or secondary side voltage regulation based on whether a low power application or a high power application is being utilized. As a result, the integrated circuit needs to be changed to either implement primary side voltage regulation or secondary side voltage regulation based on different output requirements. However, using different circuits to implement different types of voltage regulation may increase costs and reduce flexibility. Implementations described herein permit selection between primary side voltage regulation and secondary side voltage regulation on the same integrated circuit, thereby increasing flexibility and reducing costs.

Figure 1A:
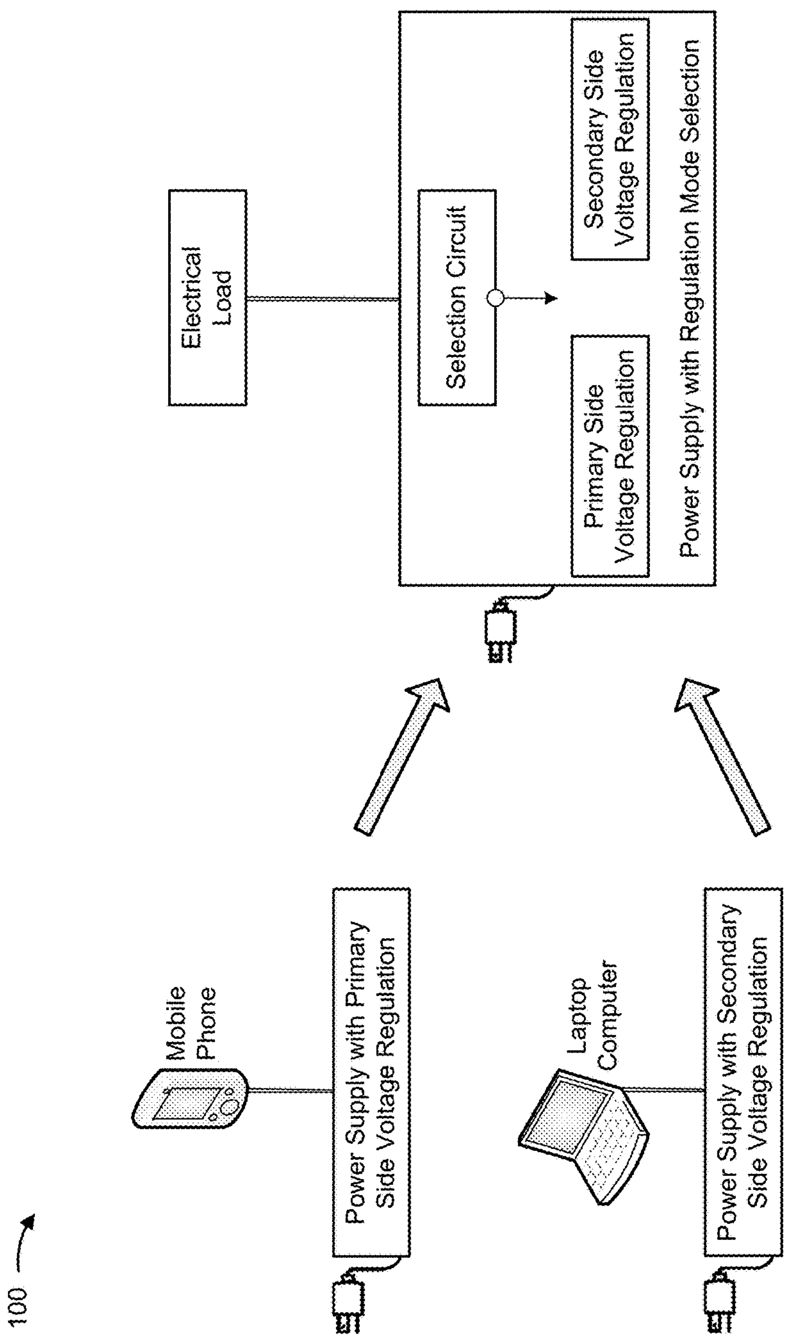
FIGS. 1A and 1B are diagrams of an overview of an example implementation described herein.
Figure 1B:
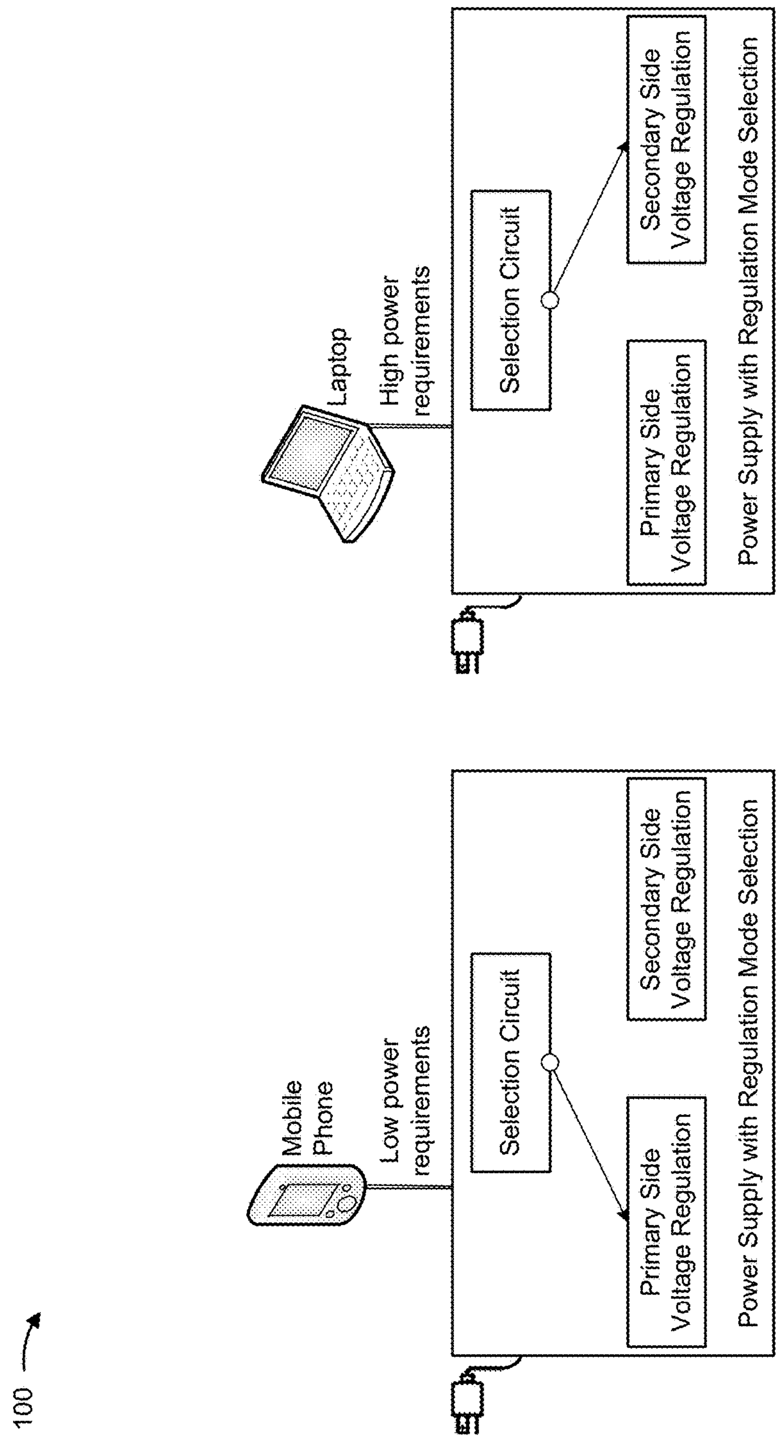

FIGS. 1A and 1B are diagrams of an overview of an example implementation 100 described herein. As shown in FIG. 1A, a power supply (e.g., a battery charger) that uses primary side voltage regulation may be used to supply power to a device with low power requirements, such as a mobile phone. As further shown, a power supply that uses secondary side voltage regulation may be used to supply power to a device with high power requirements, such as a laptop computer. Low power applications, while not limited thereto, may implement loads having 5-10 watt requirements, whereas high power applications, while not limited thereto, may implement loads having 10-30 watt requirements. Accordingly, these different power supplies may use different integrated circuits. However, as described above, using different integrated circuits for primary side voltage regulation and secondary side voltage regulation may increase costs and reduce flexibility.

As further shown in FIG. 1A, a power supply with regulation mode selection in accordance with techniques described herein may include an integrated circuit that permits a selection between primary side voltage regulation and secondary side voltage regulation. As shown, the integrated circuit may include a regulation mode selector pin ("selector pin") that selects between primary side voltage regulation and secondary side voltage regulation. In some implementations, the integrated circuit may include a controller for a direct current (DC) to DC converter. For example, the integrated circuit may include a pulse width modulation (PWM) controller for a DC-DC converter.

As shown in FIG. 1B, the selector pin may be configured to select primary side voltage regulation or secondary side voltage regulation. For example, the selector pin may detect a pin voltage (e.g., at the selector pin), may compare the pin voltage to a threshold voltage, and may select the voltage regulation mode based on the comparison, as described in more detail elsewhere herein. As an example, the selector pin may select primary side voltage regulation when the pin voltage satisfies the threshold voltage, and may select secondary side voltage regulation when the pin voltage does not satisfy the threshold voltage. Alternatively, the selector pin may select secondary side voltage regulation when the pin voltage satisfies the threshold voltage, and may select primary side voltage regulation when the pin voltage does not satisfy the threshold voltage. A peripheral circuit may be coupled to an integrated circuit, included in the power supply, to determine whether the selector pin selects primary side voltage regulation or secondary side voltage regulation (e.g., by including or not including a resistance at the selector pin to change the pin voltage). In this way, a single integrated circuit may be used to control whether the power supply uses primary side voltage regulation or secondary side voltage regulation, based on a peripheral circuit coupled thereto, thereby reducing cost and increasing flexibility.

Figure 2:
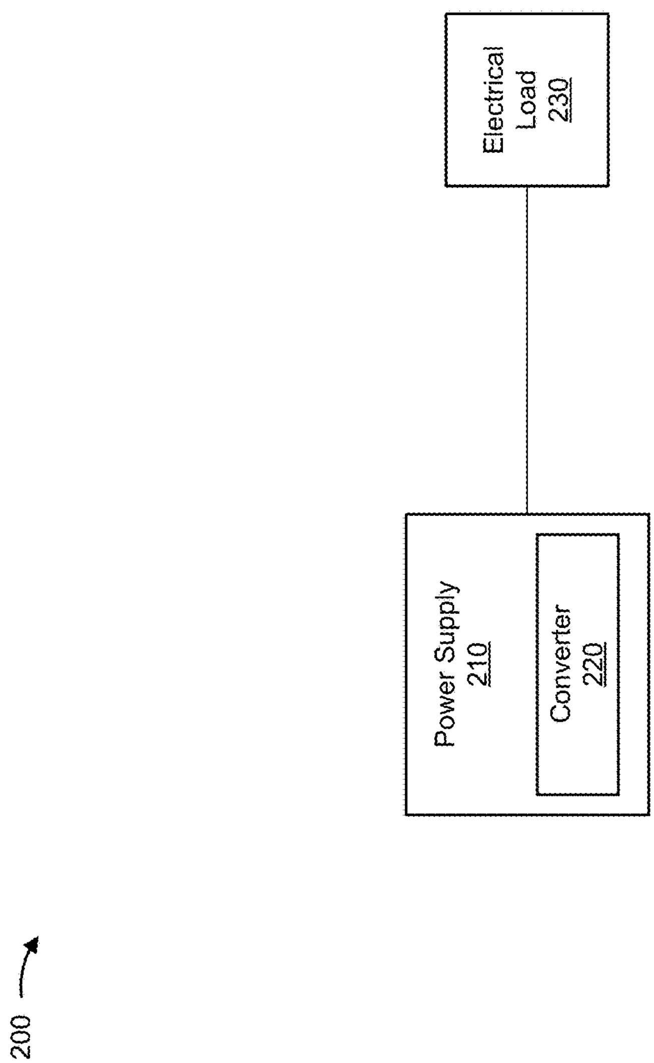
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a power supply 210, a converter 220, and an electrical load 230. Devices of environment 200 may interconnect via wired connections, wireless connections, or a combination of wired and wireless connections.

Power supply 210 may include one or more devices for supplying electrical energy to electrical load 230. For example, power supply 210 may include a battery charger, a power converter, a power adapter (e.g., an alternating current (AC) adapter), or the like. Power supply 210 may receive energy from an energy source via a power input. In some implementations, power supply 210 may convert the energy from one form to another (e.g., from a first voltage to a second voltage), and may deliver the converted energy to electrical load 230 via a power output. As shown, power supply 210 may include converter 220.

Converter 220 may include one or more integrated circuits for receiving, converting, and/or delivering energy from power supply 210 to electrical load 230. In some implementations, converter 220 may include a primary winding and a secondary winding. Converter 220 may regulate a voltage delivered to electrical load 230 using primary side voltage regulation or secondary side voltage regulation. For primary side voltage regulation, converter 220 may regulate the delivered voltage based on feedback received from one or more circuits coupled to the primary winding (and/or an auxiliary winding). For secondary side voltage regulation, converter 220 may regulate the delivered voltage based on feedback received from one or more circuits coupled to the secondary winding. Additionally, or alternatively, converter 220 may select between primary side voltage regulation and secondary side voltage regulation, as described in more detail elsewhere herein. For example, converter 220 may include a controller configured to select between primary side voltage regulation and secondary side voltage regulation and to control a mode of operation of converter 220 based on the selection.

Electrical load 230 may include one or more devices that receive electrical energy from power supply 210. For example, electrical load 230 may include an electrical device, such as a desktop computer, a laptop computer, a tablet computer, a mobile phone, a gaming device, or the like. Electrical load 230 may perform better when a voltage delivered to electrical load 230 is kept constant or nearly constant (e.g., within a tolerance range) by power supply 210. For example, electrical load 230 may be negatively impacted by a sudden voltage spike or a sudden voltage drop. Thus, power supply 210 may regulate a voltage supplied to electrical load 230 to improve performance of electrical load 230 and/or to reduce or eliminate negative impacts to electrical load 230.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. For example, power supply 210 may be implemented as part of electrical load 230. Additionally, or alternatively, a set of devices (e.g., one or more devices) of environment 200 may perform one or more functions described as being performed by another set of devices of environment 200.

Figure 3A:
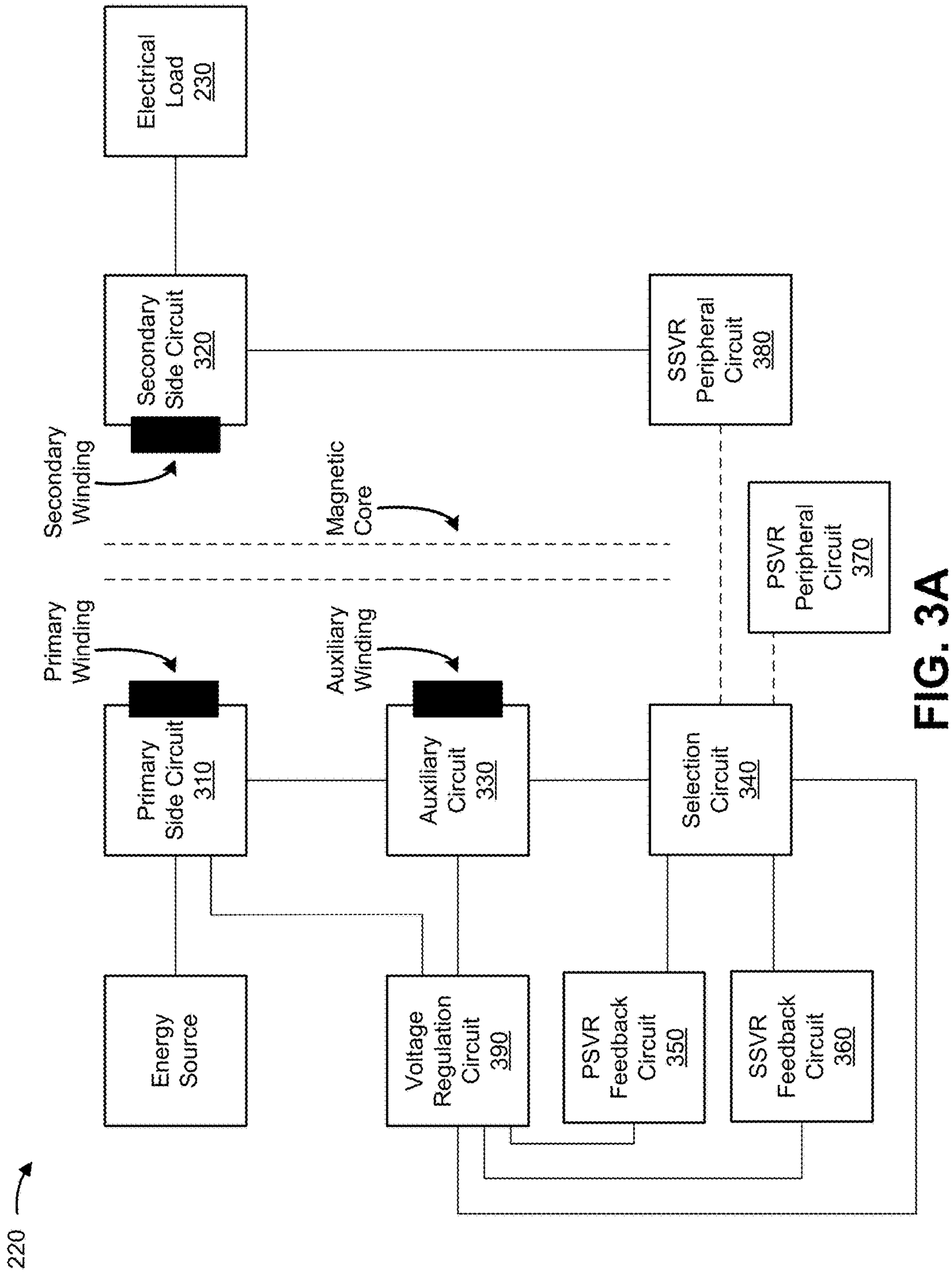
FIGS. 3A and 3B are diagrams of example components of one or more devices shown in FIG. 2.
Figure 3B:
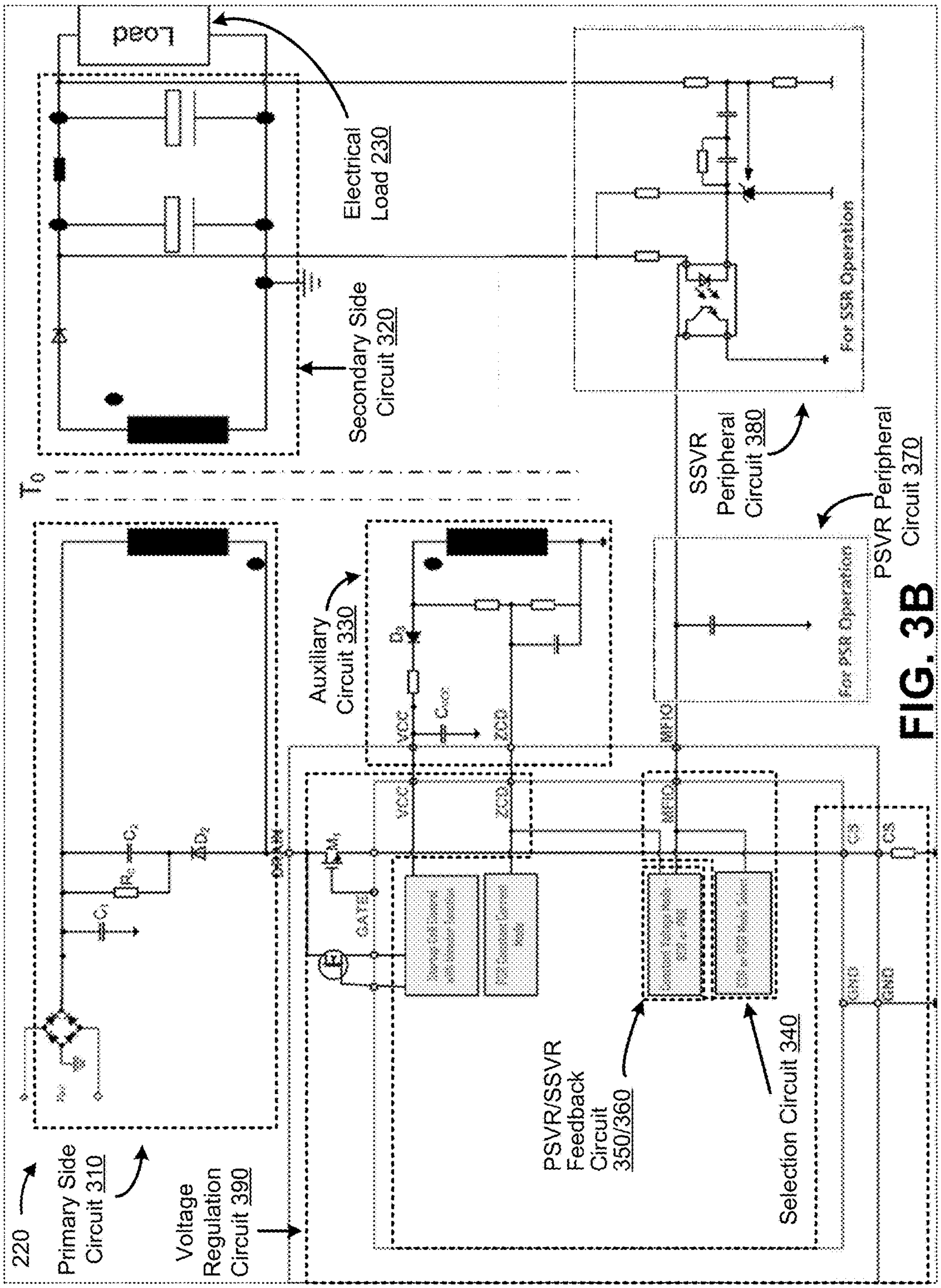

FIGS. 3A and 3B are diagrams of an example converter 220 that permits selection between primary side voltage regulation and secondary side voltage regulation. As shown in FIG. 3A, converter 220 may include a primary side circuit 310, a secondary side circuit 320, an auxiliary circuit 330, a selection circuit 340, a primary side voltage regulation (PSVR) feedback circuit 350, a secondary side voltage regulation (SSVR) feedback circuit 360, a PSVR peripheral circuit 370, an SSVR peripheral circuit 380, and a voltage regulation circuit 390. Components of converter 220 may interconnect via wired connections, wireless connections, or the like.

Primary side circuit 310 may include one or more circuits to receive energy from an energy source (e.g., an alternating current energy source, a mains power system, a wall socket, etc.), and to induce a voltage, in secondary circuit 320, to be supplied to electrical load 230. Additionally, or alternatively, primary side circuit 310 may induce a voltage in auxiliary circuit 330, which may be used to induce the voltage in secondary circuit 320 after initial startup of converter 220. As shown, primary side circuit 310 may include a primary winding (e.g., a primary coil, a primary inductor, etc.) that interacts with a magnetic core.

Secondary side circuit 320 may include one or more circuits in which a voltage is induced via interaction with the magnetic core, and that supply the voltage to electrical load 230. For example, a varying current in the primary winding of primary side circuit 310 (or an auxiliary winding of auxiliary circuit 330) may generate a varying magnetic flux in the magnetic core. The varying magnetic flux may generate a varying magnetic field applied to the secondary winding (e.g., a secondary coil, a secondary inductor, etc.) of secondary side circuit 320. This varying magnetic field may induce a voltage in secondary side circuit 320. Secondary side circuit 320 may supply this voltage to electrical load 230.

Auxiliary circuit 330 may include one or more circuits to receive energy from an energy source and to induce a voltage in secondary circuit 320 (e.g., after initial startup of converter 220). As shown, auxiliary circuit 330 may include an auxiliary winding (e.g., an auxiliary coil, an auxiliary inductor, etc.) that interacts with the magnetic core to generate a varying magnetic flux in the magnetic core. The varying magnetic flux may generate a varying magnetic field applied to the secondary winding of secondary side circuit 320. This varying magnetic field may induce a voltage in secondary side circuit 320, which may be supplied to electrical load 230.

Selection circuit 340 may include one or more circuits to select between primary side voltage regulation and secondary side voltage regulation. For example, selection circuit 340 may be coupled to PSVR feedback circuit 350 (e.g., to perform primary side voltage regulation) and/or SSVR feedback circuit 360 (e.g., to perform secondary side voltage regulation). Selection circuit 340 may receive feedback from PSVR feedback circuit 350 or SSVR feedback circuit 360 depending on a desired type of voltage regulation to be used to regulate a voltage supplied to electrical load 230. In some implementations, selection circuit 340 may receive feedback from PSVR feedback circuit 350 when PSVR peripheral circuit 370 is coupled to selection circuit 340. Additionally, or alternatively, selection circuit 340 may receive feedback from SSVR feedback circuit 360 when SSVR peripheral circuit 380 is coupled to selection circuit 340. In this way, selection circuit 340 permits converter 220 to perform primary side voltage regulation or secondary side voltage regulation depending on whether PSVR peripheral circuit 370 or SSVR peripheral circuit 380 is coupled to converter 220. This permits flexibility in the use of converter 220, and eliminates the need to have different designs for converter 220 depending on whether primary or secondary side voltage regulation is desired.

PSVR feedback circuit 350 may include one or more circuits to provide feedback used to perform primary side voltage regulation. For example, PSVR feedback circuit 350 may detect a primary voltage in primary side circuit 310 (and/or auxiliary circuit 330), and may provide feedback regarding the detected primary voltage to voltage regulation circuit 390 for performing primary side voltage regulation. As an example, PSVR feedback circuit 350 may compare the primary voltage to a reference voltage, and may provide an error signal, based on the comparison, to voltage regulation circuit 390.

SSVR feedback circuit 360 may include one or more circuits to provide feedback used to perform secondary side voltage regulation. For example, SSVR feedback circuit 360 may detect a secondary voltage in secondary side circuit 320, and may provide feedback regarding the detected secondary voltage to voltage regulation circuit 390 for performing secondary side voltage regulation. As an example, SSVR feedback circuit 360 may receive feedback, regarding the secondary voltage, from SSVR peripheral circuit 380. Additionally, or alternatively, SSVR feedback circuit 360 may provide the feedback, regarding the secondary voltage, to voltage regulation circuit 390.

PSVR peripheral circuit 370 may include one or more circuits that, when coupled to selection circuit 340, cause converter 220 to perform primary side voltage regulation to control a voltage supplied to electrical load 230. In other words, when PSVR peripheral circuit 370 is coupled to selection circuit 340, selection circuit 340 may detect the peripheral circuit as a PSVR peripheral circuit, and may select PSVR feedback circuit 350 to provide feedback regarding a primary voltage to regulate the primary voltage (and to indirectly regulate the secondary voltage), as described in more detail elsewhere herein. Thus, selection circuit 340 may select a primary side voltage regulation mode based on detecting a PSVR peripheral circuit coupled to selection circuit 340.

SSVR peripheral circuit 380 may include one or more circuits that, when coupled to selection circuit 340, cause converter 220 to perform secondary side voltage regulation to control a voltage supplied to electrical load 230. In other words, when SSVR peripheral circuit 380 is coupled to selection circuit 340, selection circuit 340 may detect the peripheral circuit as an SSVR peripheral circuit, and may select SSVR feedback circuit 360 to provide feedback regarding a secondary voltage to regulate the primary voltage (and to indirectly regulate the secondary voltage), as described in more detail elsewhere herein. In some implementations, SSVR peripheral circuit 380 may include an opto-coupler (e.g., an opto-isolator, a photocoupler, etc.), which may provide feedback, indicative of the secondary voltage, between two isolated circuits using light (e.g., from SSVR peripheral circuit 380 to SSVR feedback circuit 360). Thus, selection circuit 340 may select a secondary side voltage regulation mode based on detecting an SSVR peripheral circuit coupled to selection circuit 340.

Voltage regulation circuit 390 may include one or more circuits to directly regulate a primary voltage in primary side circuit 310 (and/or auxiliary circuit 330), thereby indirectly regulating a secondary voltage, in secondary side circuit 320, supplied to electrical load 230. Voltage regulation circuit 390 may adjust the primary voltage based on feedback received from PSVR feedback circuit 350 or SSVR feedback circuit 360. By adjusting the primary voltage in primary side circuit 310, voltage regulation circuit 390 may indirectly adjust the secondary voltage in secondary side circuit 320, because the secondary voltage is based on the primary voltage (e.g., due to electromagnetic induction).

FIG. 3B shows an example arrangement of components (e.g., circuit(s), inductor(s), winding(s), resistor(s), capacitor(s), pin(s), gate(s), opto-coupler(s), wire(s), etc.), included in converter 220, that permit selection between primary side voltage regulation and secondary side voltage regulation. These components may perform one or more functions described elsewhere herein. While FIG. 3B shows example arrangements and configurations for circuits of converter 220 (e.g., primary side circuit 310, secondary side circuit 320, auxiliary circuit 330, selection circuit 340, PSVR feedback circuit 350, SSVR feedback circuit 360, PSVR peripheral circuit 370, SSVR peripheral circuit 380, voltage regulation circuit 390, etc.), converter 220 may include different arrangements and/or configurations of circuits, in some implementations. Other example arrangements and configurations are described in more detail elsewhere herein.

The number and arrangement of components shown in FIGS. 3A and 3B are provided as an example. In practice, converter 220 may include additional components, fewer components, different components, or differently arranged components than those shown in FIGS. 3A and 3B. Additionally, or alternatively, a set of components (e.g., one or more components) of converter 220 may perform one or more functions described as being performed by another set of components of converter 220.

Figure 4:
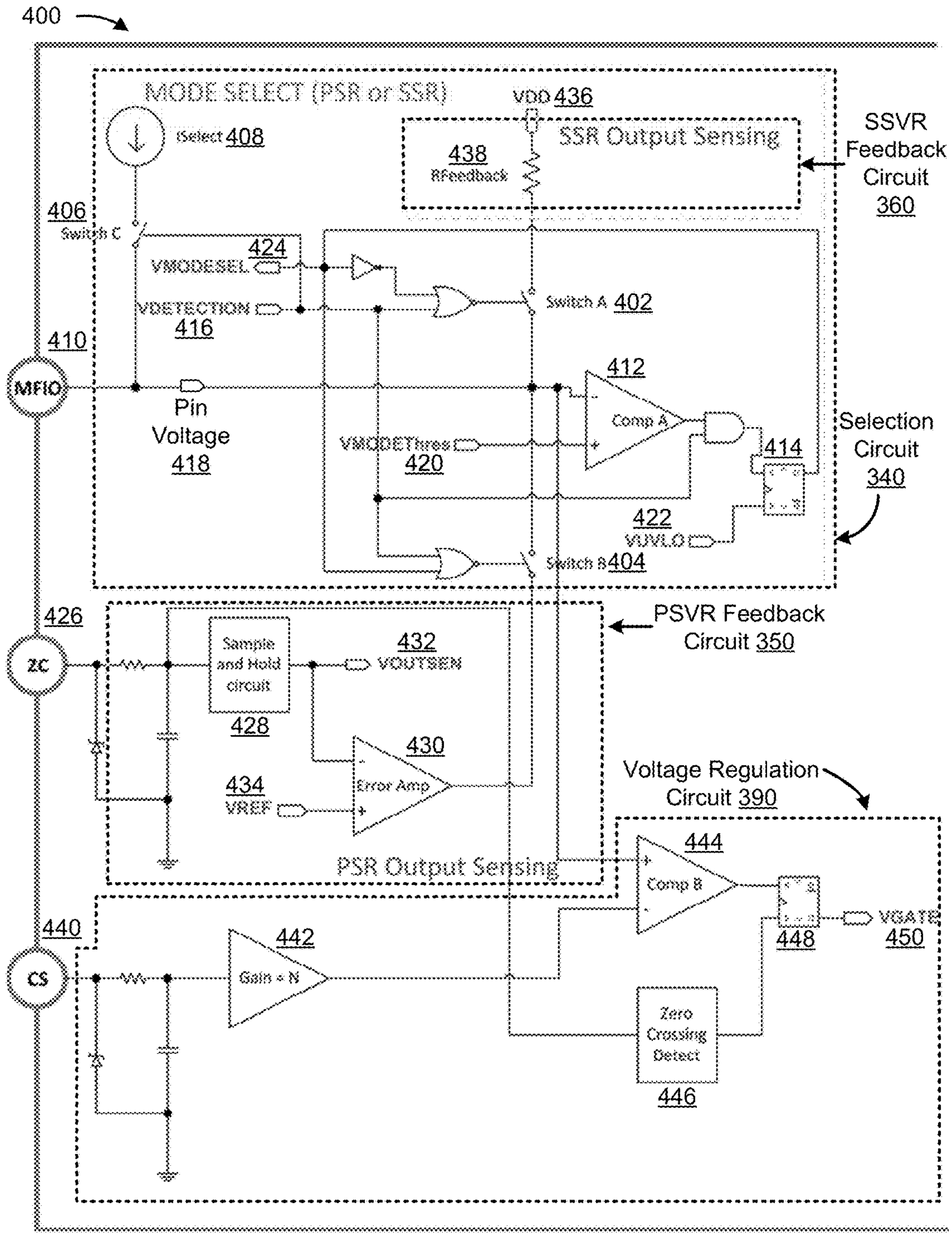
FIG. 4 is a diagram of an example circuit for selection between primary side voltage regulation and secondary side voltage regulation.

FIG. 4 is a diagram of an example circuit 400 for selection between primary side voltage regulation and secondary side voltage regulation. Circuit 400 may be included in converter 220. As shown, circuit 400 may include one or more of components of selection circuit 340, PSVR feedback circuit 350, SSVR feedback circuit 360, and/or voltage regulation circuit 390.

As shown in FIG. 4, selection circuit 340 may include a first switch 402 (shown as "Switch A"), a second switch 404 (shown as "Switch B"), a third switch 406 (shown as "Switch C"), a current source 408 (shown as "ISelect"), a selector pin 410 (shown as "MFIO," or multi-function input/output pin), a comparator 412 (shown as "Comp A"), and a flip flop circuit 414. Switch A 402 may be used to switch secondary side voltage regulation on or off. Switch B 404 may be used to switch primary side voltage regulation on or off. Switch C 406 may be used to switch regulation mode selection on or off.

For example, when circuit 400 powers up, Switch A 402 and Switch B 404 may be set to off, such that neither primary side voltage regulation nor secondary side voltage regulation is selected (e.g., PSVR feedback circuit 350 and SSVR feedback circuit 360 are de-coupled from voltage regulation circuit 390). At this time (e.g., at initial power up of circuit 400 and/or at a soft start phase of converter 220), Switch C 406 may be set to on, permitting a current from current source 408 to flow to selector pin 410. In some implementations, switches 402-406 may be controlled by a detection signal 416 (shown as "VDETECTION").

Detection signal 416 may indicate whether to perform regulation mode selection (e.g., at initial power up of circuit 400 and/or at a soft start phase of converter 220). For example, detection signal 416 may enable regulation mode selection (e.g., by enabling Switch C 406 and disabling both Switch A 402 and Switch B 404) when a power supply pin (shown as VCC in FIG. 3B) has charged to a threshold voltage (e.g., indicating that auxiliary circuit 330 and/or another component of converter 220 has powered on). In some implementations, detection signal 416 may enable regulation mode selection for a threshold amount of time (e.g., one millisecond, three milliseconds, etc.), after which time Switch C 406 may be turned off. When regulation mode selection is enabled, selection circuit 340 may perform regulation mode selection to select primary side voltage regulation or secondary side voltage regulation.

Figure 5A:
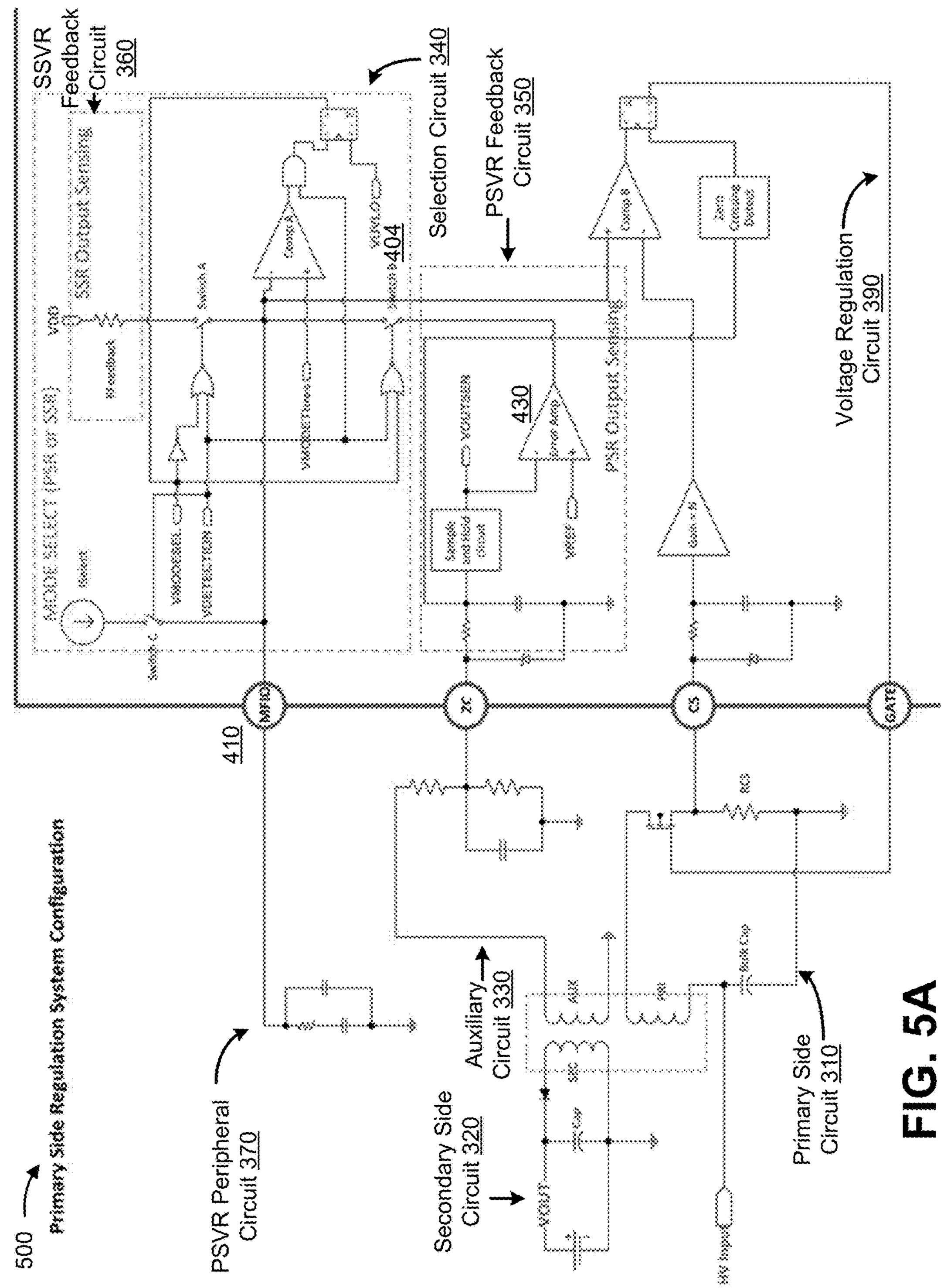
FIGS. 5A and 5B are additional diagrams of example circuits for selection between primary side voltage regulation and secondary side voltage regulation.

During regulation mode selection, a current from current source 408 may flow to selector pin 410, and selector pin 410 may detect a pin voltage 418 at selector pin 410. In some implementations, the current from current source 408 may be fixed. Accordingly, as the current from current source 408 flows out of selector pin 410 to a peripheral circuit, pin voltage 418 may depend on a peripheral circuit coupled to selector pin 410. For example, when primary side peripheral circuit 370 is coupled to selector pin 410, pin voltage 418 may be higher than when secondary side peripheral circuit 380 is coupled to selector pin 410 (e.g., due to a resistor connecting the selector pin 410 directly to ground in secondary side peripheral circuit 380). When there is no resister connecting the selector pin 410 directly to ground, for example as in primary side peripheral circuit 370, the impedance to ground is considered as infinite. For example, primary side peripheral circuit 370 may include a filter or other type of blocking circuit, as shown in FIG. 5A, which has a high impedance. As a result, pin voltage 418 is higher when primary side peripheral circuit 370 is coupled to selector pin 410 than when secondary side peripheral circuit 380, having a resistor directly connected to ground (i.e., the impedance to ground is not considered infinite), is coupled to selector pin 410.

In some implementations, configurations other than a single resistor that makes a direct connection from selector pin 410 to ground may be used to differentiate primary side peripheral circuit 370, having a higher impedance, from secondary side peripheral circuit 380, having a lower impedance. For example, multiple resistors in series may be used, or other combinations of components can be used to establish a different (e.g., lower) level of impedance and/or a voltage threshold level that can be used to differentiate secondary side peripheral circuit 380 from primary side peripheral circuit 370. As another example, a charging time of selector pin 410 may be used to differentiate primary side peripheral circuit 370 from secondary side peripheral circuit 380. In this case, a capacitor may be connected to selector pin 410, and selector pin 410 may be charged for a fixed period of time during or after startup. After the fixed period of time has elapsed, pin voltage 410 may be measured at selector pin 410 to determine whether to select primary side voltage regulation or secondary side voltage regulation (e.g., based on whether pin voltage 410 satisfies or does not satisfy a threshold voltage, as described elsewhere herein). Examples of different peripheral circuits are described in more detail in connection with FIGS. 5A and 5B.

As further shown in FIG. 4, selector pin 410 may provide pin voltage 418 to comparator 412. As further shown, a threshold voltage 420 (shown as "VMODEThres") may be input to selection circuit 340. Threshold voltage 420 may be set to a predetermined value, such as approximately 4.5 volts, approximately 5 volts, or the like. In some implementations, threshold voltage 420 may be in a range between approximately 4.5 volts to approximately 5 volts, inclusive. In some implementations, threshold voltage 420 may be greater than 5 volts or less than 4.5 volts. As shown, pin voltage 418 and threshold voltage 420 may be input to comparator 412. Comparator 412 may compare pin voltage 418 and threshold voltage 420. Based on the comparison, comparator 412 may output a comparison signal indicating whether pin voltage 418 satisfies threshold voltage 420 (e.g., whether pin voltage 418 is greater than threshold voltage 420, is greater than or equal to threshold voltage 420, is less than threshold voltage 420, is less than or equal to threshold voltage 420, etc.).

As further shown in FIG. 4, an undervoltage-lockout signal 422 (shown as "VUVLO") may be input to selection circuit 340. Undervoltage-lockout signal 422 may be used to turn off the power to converter 220 when the power supply of converter 220 drops below a particular value (e.g., an operational value and/or voltage used by converter 220), thus protecting electrical load 230. Undervoltage-lockout signal 422 and the comparison signal from comparator 412 may control flip flop circuit 414. For example, flip flop circuit 414 may output a mode selection signal 424 (shown as "VMODESEL") based on the comparison signal and undervoltage-lockout signal 422. Mode selection signal 424 may control Switch A 402 and/or Switch B 404. Additionally, or alternatively, mode selection signal 424 may control one or more other switches to turn circuits associated with primary side voltage regulation or secondary side voltage regulation on or off. For example, mode selection signal 424 may be used to configure a setting of a circuit, such as a gain of gain circuit 442, a voltage threshold of a protection circuit, or the like (e.g., based on selecting PSVR or SSVR). As another example, mode selection signal 424 may be used to turn off one or more redundant circuits (e.g., based on selecting PSVR or SSVR). In this way, selection circuit 340 may conserve power by powering off one or more circuits that are not used to perform primary side voltage regulation or secondary side voltage regulation (e.g., depending on which voltage regulation mode is selected).

As an example, when pin voltage 418 is greater than threshold voltage 420, mode selection signal 424 may cause Switch B 404 to turn on (e.g., activate), and/or may cause Switch A 402 to remain off (e.g., deactivate). In this way, when pin voltage 418 is greater than threshold voltage 420 (e.g., indicating that primary side peripheral circuit 370 is coupled to selector pin 410), selection circuit 340 may activate primary side voltage regulation (e.g., by turning on a switch that connects PSVR feedback circuit 350 to voltage regulation circuit 390).

As another example, when pin voltage 418 is less than threshold voltage 420, mode selection signal 424 may cause Switch A 402 to turn on (e.g., activate), and/or may cause Switch B 404 to remain off (e.g., deactivate). In this way, when pin voltage 418 is less than threshold voltage 420 (e.g., indicating that secondary side peripheral circuit 380 is coupled to selector pin 410), selection circuit 340 may activate secondary side voltage regulation (e.g., by turning on a switch that connects SSVR feedback circuit 360 to voltage regulation circuit 390).

As further shown in FIG. 4, PSVR feedback circuit 350 may include a zero-crossing pin 426 (shown as "ZC"), a sample and hold circuit 428, and an error amplifier circuit 430. When PSVR peripheral circuit 370 is connected to selector pin 410, zero-crossing pin 426 may detect a zero-crossing voltage at zero-crossing pin 426. In some implementations, zero-crossing pin 426 may sample the zero-crossing voltage at a point in time just before the voltage on the auxiliary winding (not shown) begins to oscillate (e.g., at a point in time when the current on the secondary winding drops to zero). Zero-crossing pin 426 may provide the zero-crossing voltage to sample and hold circuit 428. Sample and hold circuit 428 may receive multiple zero-crossing voltage samples over time, and may process the zero-crossing voltage samples to generate a processed voltage signal 432 (shown as "VOUTSEN"). Additionally, or alternatively, sample and hold circuit 428 may hold a sample, determined based on a first electrical pulse, to apply the sample to a second electrical pulse (e.g., at a later time). In some implementations, the zero-crossing voltage may represent a knee point of the auxiliary winding voltage.

As shown, sample and hold circuit 428 may provide processed voltage signal 432 to error amplifier circuit 430 (e.g., a proportional-integral (PI) controller, a proportional-integral-derivative (PID) controller, etc.). As further shown, error amplifier circuit 430 may receive a voltage reference signal 434 (shown as "VREF"). Voltage reference signal 434 may be set to a predetermined value to assist in adjusting the primary voltage and/or the auxiliary voltage. Error amplifier circuit 430 may compare processed voltage signal 432 and voltage reference signal 434 to generate an error signal (e.g., a voltage adjustment signal), and may provide the error signal to voltage regulation circuit 390. Additionally, or alternatively, selector pin 410 may provide loop compensation for error amplifier circuit 430. Further details of primary side voltage regulation are described herein in connection with FIG. 5A.

As further shown in FIG. 4, SSVR feedback circuit 360 may include a power supply pin 436 (shown as "VDD") and a feedback resistor 438 (shown as "RFeedback"). When SSVR peripheral circuit 380 is connected to selector pin 410, SSVR peripheral circuit 380 may detect a secondary voltage, output by the secondary winding, via an opto-coupler, and may provide a current to selector pin 410 based on the secondary voltage. The current may be converted into an error signal (e.g., an error voltage) using feedback resistor 438 (e.g., where selector pin 410 provides feedback for secondary side voltage regulation), which may generate a resistance based on power received from power supply pin 436. The error signal may be provided to voltage regulation circuit 390. In this way, selector pin 410 may provide feedback from the opto-coupler to voltage regulation circuit 390. Further details of secondary side voltage regulation are described herein in connection with FIG. 5B.

As further shown in FIG. 4, voltage regulation circuit 390 may include a current sensor pin 440 (shown as "CS"), a gain circuit 442, a comparator 444 (shown as "Comp B"), a zero-crossing detector 446, and a flip flop circuit 448. Current sensor pin 440 may determine a voltage of the primary winding (and/or the auxiliary winding), and may provide a voltage signal to comparator 444. In some implementations, the voltage signal may be amplified by gain circuit 442 before being provided to comparator 444. Additionally, or alternatively, an amplification of gain circuit 442 may depend on whether primary side voltage regulation or secondary side voltage regulation is selected. Comparator 444 may compare an error signal (e.g., received from PSVR feedback circuit 350) or a feedback signal (e.g., received from SSVR feedback circuit 360 and/or SSVR peripheral circuit 380) to the voltage signal received from gain circuit 442 to generate a comparison signal, which may be provided to flip flop circuit 448. As an example, during primary side voltage regulation, comparator 444 may compare the error signal from error amplifier circuit 430 to the voltage at current sensor pin 440 (or at the output of gain circuit 442) to determine the on-time of a switch of voltage regulation circuit 390. The turning on may be performed based on sensing the zero-crossing through zero-crossing pin 426. Zero-crossing detector 446 may detect a zero-crossing of the auxiliary winding (e.g., based on a signal received from zero-crossing pin 426), and may provide a zero-crossing signal to flip flop circuit 448.

Flip flop circuit 448 may use the comparison signal from comparator 444 and the zero-crossing signal from zero-crossing pin 426 to generate a gate control signal 450 (shown as "VGATE"). Gate control signal 450 may be provided to a gate (e.g., a MOSFET gate), which may control a voltage of the primary winding and/or the auxiliary winding. For example, the gate may be turned on or off based on gate control signal 450, which may control a voltage of the primary winding and/or the auxiliary winding. As an example, when the gate is turned on, a primary current in primary side circuit 310 may increase until a current threshold is satisfied. Current sensor pin 440 may detect the primary current and/or a primary voltage that depends on the primary current. When the primary current and/or the primary voltage reaches a threshold, the gate may be turned off, which may establish an auxiliary voltage in auxiliary circuit 330 and/or a secondary current in secondary side circuit 320. The secondary current (and/or a secondary voltage associated with the secondary current) may decrease over time. When the secondary current satisfies a threshold (e.g., zero or substantially zero within a tolerance), zero-crossing pin 426 may sample the auxiliary voltage. The sampled voltage may be sampled and held to control the gate (e.g., by adjusting an error signal based on the auxiliary voltage).

In this way, voltage regulation circuit 390 may control a primary voltage, in primary side circuit 310, and/or an auxiliary voltage in auxiliary circuit 330. By controlling the primary voltage and/or the auxiliary voltage, voltage regulation circuit 390 may also control a secondary voltage, in secondary side circuit 320, which depends on the primary voltage and/or the auxiliary voltage. By controlling the secondary voltage, voltage regulation circuit 390 may ensure proper performance of electrical load 230 and/or may prevent damage to electrical load 230.

The number and arrangement of components shown in FIG. 4 are provided as an example. In practice, circuit 400 may include additional components, fewer components, different components, or differently arranged components than those shown in FIG. 4. Additionally, or alternatively, a set of components described in connection with FIG. 4 may perform one or more functions described as being performed by another set of components described in connection with FIG. 4.

Figure 5B:
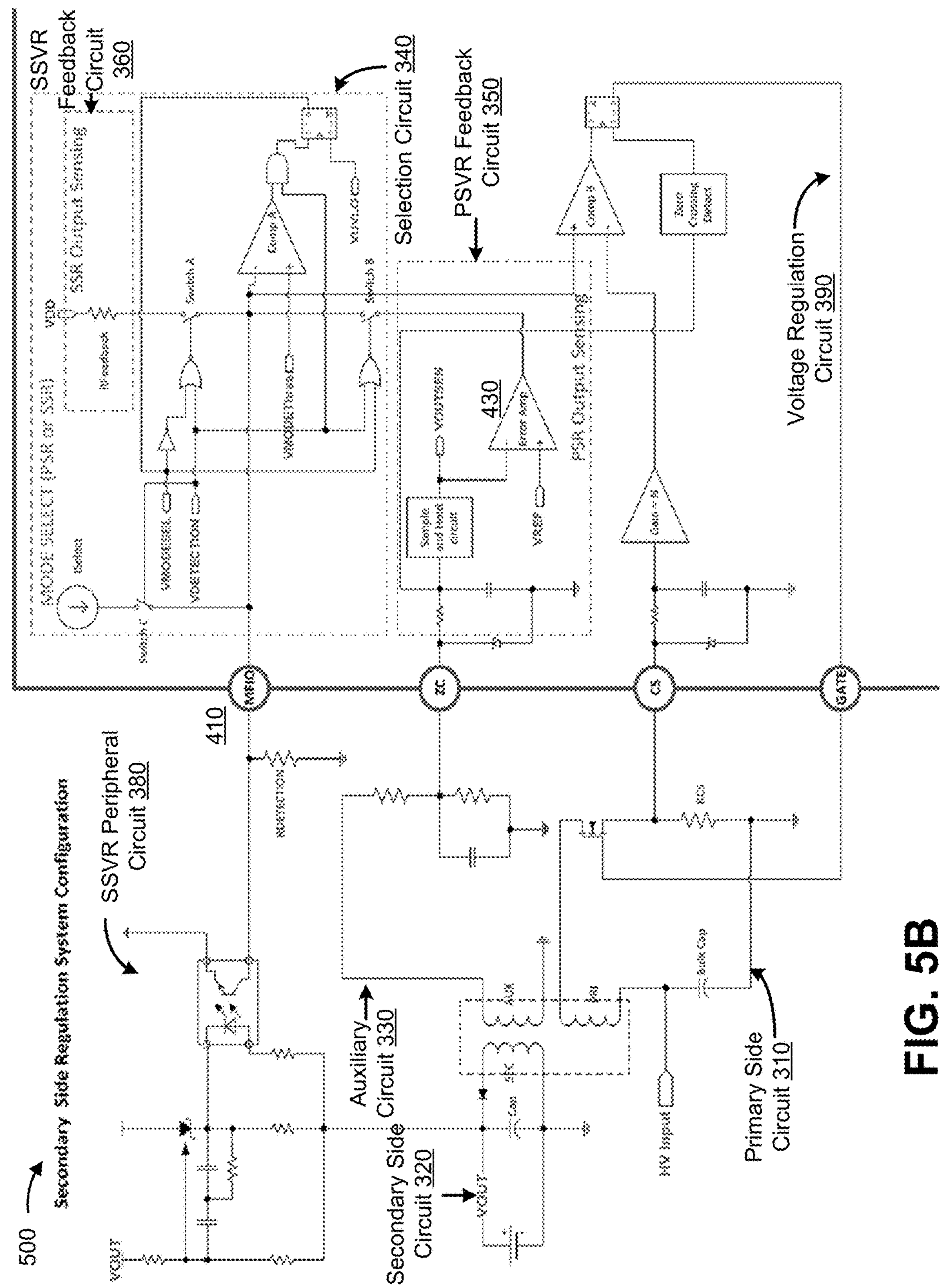

FIGS. 5A and 5B are diagrams of example circuits 500 for selection between primary side voltage regulation and secondary side voltage regulation. FIG. 5A shows an example of a PSVR peripheral circuit 370 that may be coupled to selector pin 410 to activate primary side voltage regulation. FIG. 5B shows an example of an SSVR peripheral circuit 380 that may be coupled to selector pin 410 to activate secondary side voltage regulation. In general, SSVR peripheral circuit 380 may cause a lower voltage to occur at selector pin 410 than a voltage caused by PSVR peripheral circuit 370, e.g., due to an additional resistive element connecting the selector pin 410 directly to ground that may be present in SSVR peripheral circuit 380.

As shown in FIG. 5A, PSVR peripheral circuit 370 may be coupled to selector pin 410, in some implementations. For example, PSVR peripheral circuit 370 may be coupled to selector pin 410 when electrical load 230 has low power requirements (e.g., below a threshold), such as a mobile phone having a power requirement of about 5 watts to about 10 watts, less than 10 watts, less than or equal to 10 watts, or the like. PSVR peripheral circuit 370 may include a filter or other type of blocking circuit, as shown, which has a high impedance and causes a voltage at selector pin 410 to be high (e.g., above a threshold). PSVR peripheral circuit 370 may not include a resistive element, e.g., a resistor, directly coupling selector pin 410 (e.g., in series) to ground, so that extra gain or attenuation is not present at selector pin 410, since selector pin 410 may be used for loop compensation in primary side voltage regulation. When there is no resistor that provides a direct connection from selector pin 410 to ground, only a high or higher impedance path is present. Thus, pin voltage 418 may be higher in this case than when there is a resistor that provides a direct connection from selector pin 410 to ground. As a result, pin voltage 418 may be higher than threshold voltage 420, causing selection circuit 340 to select primary side voltage regulation when PSVR peripheral circuit 370 is coupled to selector pin 410 (e.g., selection circuit 340 may turn Switch B 404 on). In this way, selection circuit 340 may select a voltage regulation mode based on a resistance detected by selector pin 410. For example, if the resistance at selector pin 410 to ground is high (e.g., above a threshold), and/or if selector pin 410 is floating (e.g., unused), then selection circuit 410 may select primary side voltage regulation.

As shown in FIG. 5B, SSVR peripheral circuit 380 may be coupled to selector pin 410, in some implementations. For example, SSVR peripheral circuit 380 may be coupled to selector pin 410 when electrical load 230 has high power requirements (e.g., above a threshold), such as a laptop computer having a power requirement of about 10 watts to 30 watts, greater than 10 watts, greater than or equal to 10 watts, or the like. SSVR peripheral circuit 380 may include a detection resistor (e.g., shown as "RDETECTION") directly coupling (e.g., in series) selector pin 410 to ground. For example, SSVR peripheral circuit 380 may include a resistive element, e.g., a detection resistor RDETECTION, directly coupled to selector pin 410 on one end and directly coupled to ground on another end. Detection resistor RDETECTION may have a resistance of approximately 330 kiloohms, in some implementations, but is not limited thereto. In some implementations, the resistance of detection resistor RDETECTION may be based on a value of current source 408. The detection resistor RDETECTION may be directly connected to ground, and may provide a direct connection from selector pin 410 to ground. When a resistor (e.g., RDETECTION) provides a direct connection from selector pin 410 to ground, the resistor provides a low or lower impedance path. Thus, pin voltage 418 may be lower in this case than when there is no resistor that provides a direct connection from selector pin 410 to ground. As a result, pin voltage 418 may be lower than threshold voltage 420, causing selection circuit 340 to select secondary side voltage regulation when SSVR peripheral circuit 380 is coupled to selector pin 410 (e.g., selection circuit 340 may turn Switch A 402 on). In other words, detection resistor RDETECTION provides a connection from selector pin 410 directly to ground, which causes pin voltage 418 to be lower.

In some implementations, configurations other than a single resistor that makes a direct connection from selector pin 410 to ground may be used to differentiate primary side peripheral circuit 370, having a higher impedance, from secondary side peripheral circuit 380, having a lower impedance. For example, multiple resistors in series may be used, or other combinations of components can be used to establish a different (e.g., lower) level of impedance and/or a voltage threshold level that can be used to differentiate secondary side peripheral circuit 380 from primary side peripheral circuit 370. As another example, a charging time of selector pin 410 may be used to differentiate primary side peripheral circuit 370 from secondary side peripheral circuit 380. In this case, a capacitor may be connected to selector pin 410, and selector pin 410 may be charged for a fixed period of time during or after startup. After the fixed period of time has elapsed, pin voltage 410 may be measured at selector pin 410 to determine whether to select primary side voltage regulation or secondary side voltage regulation (e.g., based on whether pin voltage 410 satisfies or does not satisfy a threshold voltage, as described elsewhere herein).

In this way, a coupling of the peripheral circuit to selector pin 410, detected and analyzed by selection circuit 340, may cause an operation of selection circuit 340 in association with primary side voltage regulation or secondary side voltage regulation. For example, the coupling of PSVR peripheral circuit 370 may cause selection circuit 340 to provide loop compensation for an error signal received from PSVR feedback circuit 350. The loop compensation may reduce or eliminate undesirable oscillation in a control feedback loop used for primary side voltage regulation (e.g., where the selector pin is part of the control feedback loop). As another example, the coupling of SSVR peripheral circuit 380 may cause selection circuit 340 to provide feedback for secondary side voltage regulation (e.g., a voltage to be supplied to voltage regulation circuit 390).

As indicated above, FIGS. 5A and 5B are provided merely as examples. Other examples are possible and may differ from what was described with regard to FIGS. 5A and 5B.

Figure 6:
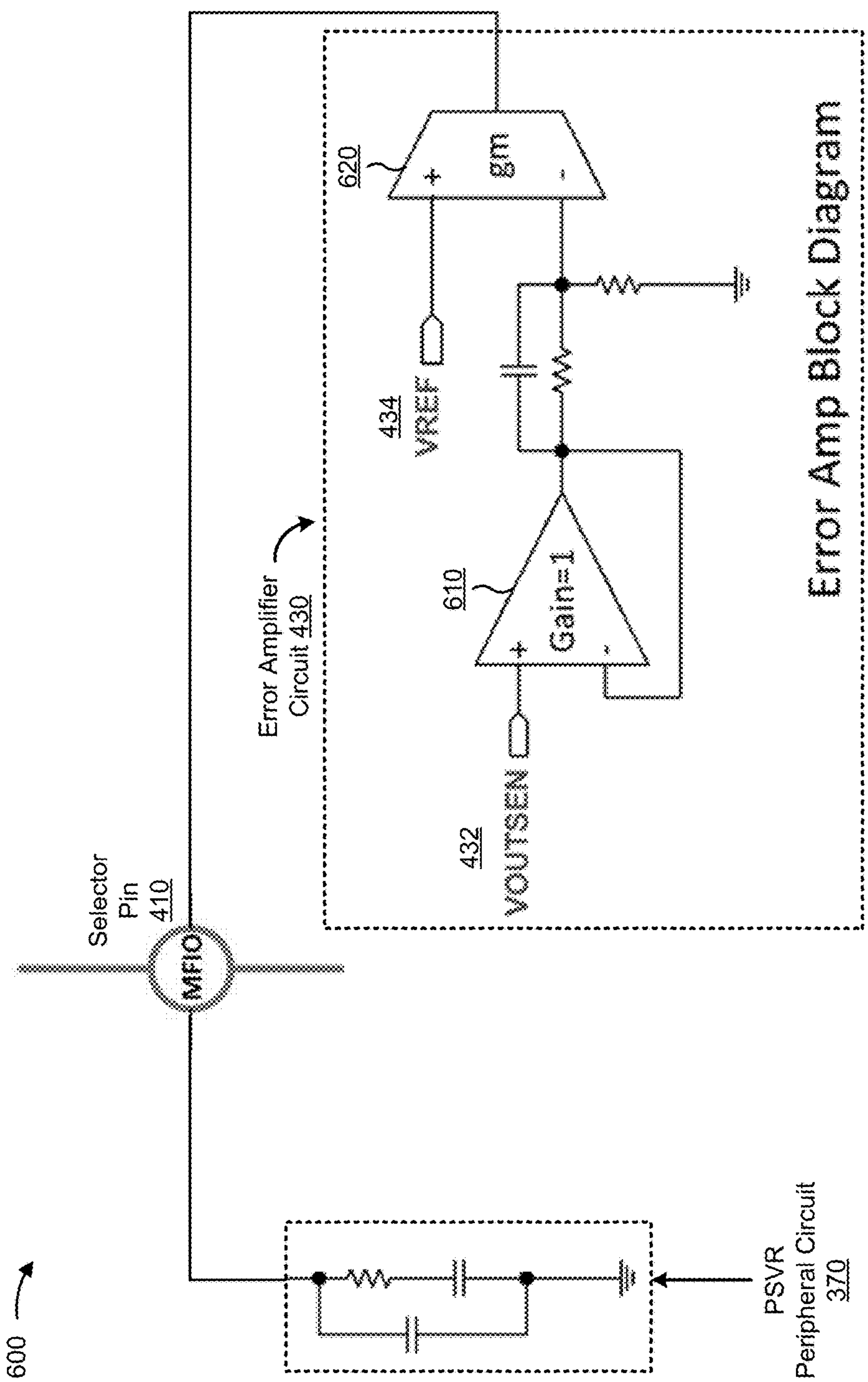
FIG. 6 is a diagram of an example circuit associated with performing primary side voltage regulation.

FIG. 6 is a diagram of an example circuit 600 associated with error amplifier circuit 430 used to perform primary side voltage regulation. As shown, circuit 600 may include error amplifier circuit 430, selector pin 410, and PSVR peripheral circuit 370.

As shown, processed voltage signal 432 (shown as "VOUTSEN"), output from sample and hold circuit 428, may be received by an amplifier circuit 610, may be amplified, and may be provided to a comparator circuit 620. Comparator circuit 620 may compare this input to voltage reference signal 434 (shown as "VREF"), and may generate an error signal based on the comparison. As shown, the error signal may be provided to selector pin 410 (e.g., via switch B 404 in FIG. 4). Additionally, or alternatively, the error signal may be provided to voltage regulation circuit 390, as described elsewhere herein. As shown, PSVR peripheral circuit 370 may not include a low impedance path which directly connects (e.g., via a resistor) selector pin 410 to ground. In some implementations, SSVR peripheral circuit 380 may include a low impedance path which directly connects (e.g., via a resistor) selector pin 410 to ground. These configurations assist in generating a high voltage signal or a low voltage signal (e.g., pin voltage 418), to be compared with threshold voltage 420 to control voltage regulation mode selection.

As indicated above, FIG. 6 is provided merely as an example. Other examples are possible and may differ from what was described with regard to FIG. 6.

Figure 7:
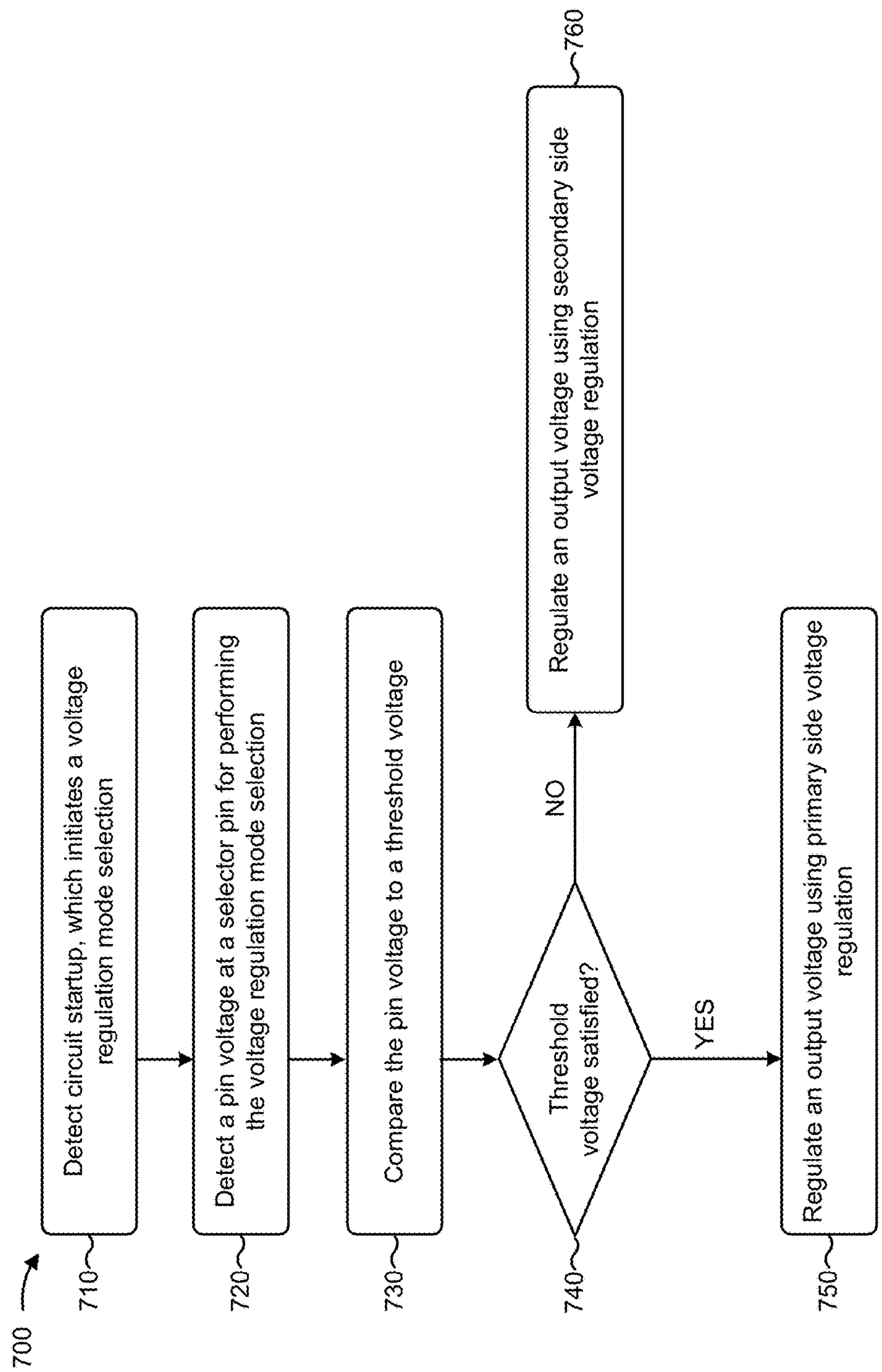
FIG. 7 is a flow chart of an example process for selection between primary side voltage regulation and secondary side voltage regulation.

FIG. 7 is a flow chart of an example process 700 for selection between primary side voltage regulation and secondary side voltage regulation. In some implementations, one or more process blocks of FIG. 7 may be performed by power supply 210 and/or converter 220. In some implementations, one or more process blocks of FIG. 4 may be performed by another device or a group of devices separate from or including power supply 210 and/or converter 220, such as electrical load 230.

As shown in FIG. 7, process 700 may include detecting circuit startup, which initiates a voltage regulation mode selection (block 710), and detecting a pin voltage at a selector pin for performing the voltage regulation mode selection (block 720). For example, converter 220 may detect when converter 220 has powered up (e.g., based on detecting that a voltage in converter 220 satisfies a threshold). Based on detecting that converter 220 has powered up, selection circuit 340 may begin regulation mode selection. Regulation mode selection may include detecting pin voltage 418 at selector pin 410, as described in more detail elsewhere herein.

As further shown in FIG. 7, process 700 may include comparing the pin voltage to a threshold voltage (block 730), and determining whether the pin voltage satisfies the threshold voltage (block 740). For example, converter 220 may compare pin voltage 418 and threshold voltage 420 to determine whether pin voltage 418 satisfies threshold voltage 420, as described in more detail elsewhere herein.

As further shown in FIG. 7, if the pin voltage satisfies the threshold voltage (block 740—YES), then process 700 may include regulating an output voltage using primary side voltage regulation (block 750). For example, if pin voltage 418 satisfies threshold voltage 420 (e.g., is greater than threshold voltage 420, is greater than or equal to threshold voltage 420, etc.), then converter 220 may regulate an output voltage, supplied to electrical load 230, using primary side voltage regulation, as described in more detail elsewhere herein.

As further shown in FIG. 7, if the pin voltage does not satisfy the threshold voltage (block 740—NO), then process 700 may include regulating an output voltage using secondary side voltage regulation (block 760). For example, if pin voltage 418 does not satisfy threshold voltage 420 (e.g., is less than threshold voltage 420, is less than or equal to threshold voltage 420, etc.), then converter 220 may regulate an output voltage, supplied to electrical load 230, using secondary side voltage regulation, as described in more detail elsewhere herein.

As another example, if pin voltage 418 satisfies threshold voltage 420 (e.g., is greater than threshold voltage 420, is greater than or equal to threshold voltage 420, etc.), then converter 220 may regulate an output voltage, supplied to electrical load 230, using secondary side voltage regulation, as described in more detail elsewhere herein. As another example, if pin voltage 418 does not satisfy threshold voltage 420 (e.g., is less than threshold voltage 420, is less than or equal to threshold voltage 420, etc.), then converter 220 may regulate an output voltage, supplied to electrical load 230, using primary side voltage regulation, as described in more detail elsewhere herein.

In this way, a single integrated circuit within converter 220 may be used to select between primary side voltage regulation and secondary voltage regulation. With a more flexible integrated circuit that can be used in different situations, depending on whether primary side voltage regulation or secondary side voltage regulation is more beneficial, costs can be reduced by avoiding the development and manufacturing of multiple integrated circuits for the different situations.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
an integrated circuit configured to:
detect a pin voltage at a selector pin;
compare the pin voltage to a threshold voltage; and selectively:
connect a primary side feedback circuit to a voltage regulation circuit based on the pin voltage satisfying the threshold voltage, or
connect a secondary side feedback circuit to the voltage regulation circuit based on the pin voltage not satisfying the threshold voltage,
a voltage supplied to an electrical load coupled to the integrated circuit being selectively regulated based on comparing the pin voltage to the threshold voltage,
the primary side feedback circuit providing first feedback to the voltage regulation circuit to regulate a primary voltage in a primary side circuit,
the first feedback relating to the primary voltage,
the secondary side feedback circuit providing second feedback to the voltage regulation circuit to regulate the primary voltage,
the second feedback relating to a secondary voltage in a secondary side circuit,
the secondary side circuit including one or more circuits in which a voltage is induced via a magnetic field, and
the primary side feedback circuit being different than the secondary side feedback circuit.

2. The device of claim 1, wherein the integrated circuit is configured to:
selectively:
perform a primary side voltage regulation when the pin voltage satisfies the threshold voltage, or
perform a secondary side voltage regulation when the pin voltage does not satisfy the threshold voltage,
the pin voltage being regulated via the primary side voltage regulation in a different manner than via the secondary side voltage regulation.

3. The device of claim 1, wherein the primary voltage is a voltage associated with one of a primary winding or an auxiliary winding of the integrated circuit.

4. The device of claim 1, wherein the secondary voltage is a voltage associated with a secondary winding of the integrated circuit.

5. The device of claim 1, wherein the integrated circuit is further configured to:
detect a startup of the integrated circuit; and
supply a current to the selector pin based on detecting the startup; and
wherein the integrated circuit, when detecting the pin voltage, is configured to:
detect the pin voltage based on the current supplied to the selector pin.

6. The device of claim 5, wherein the integrated circuit is further configured to:
activate, based on detecting the startup, a switch that causes the current to be supplied to the selector pin,
the switch being activated for a threshold period of time; and
deactivate the switch when the threshold period of time has passed.

7. The device of claim 1, wherein the integrated circuit, when detecting the pin voltage, is configured to:
detect the pin voltage based on a peripheral circuit coupled to the selector pin; and
wherein the integrated circuit is further to:
evaluate, based on comparing the pin voltage to the threshold voltage, a type of the peripheral circuit coupled to the selector pin; and
select one of a primary side voltage regulation or a secondary side voltage regulation based on the type of the peripheral circuit coupled to the selector pin.

8. The device of claim 7, wherein the integrated circuit is further configured to:
supply a current to the peripheral circuit, through the selector pin, such that the pin voltage is generated at the selector pin,
the pin voltage generated by the current being based on the type of the peripheral circuit coupled to the selector pin.

9. The device of claim 1, wherein the integrated circuit is further configured to:
selectively:
provide third feedback from an error amplifier to control the primary voltage when the primary side feedback circuit is connected to the voltage regulation circuit,
the primary voltage being a voltage associated with one of a primary winding or an auxiliary winding of the integrated circuit; or
provide fourth feedback from an opto-coupler to control the primary voltage when the secondary side feedback circuit is connected to the voltage regulation circuit.

10. A power supply, comprising:
a converter configured to:
determine a first voltage at a selector pin;
compare the first voltage to a second voltage; and selectively:
connect a primary side feedback circuit to a voltage regulation circuit based on the first voltage being greater than or equal to the second voltage, or
connect a secondary side feedback circuit to the voltage regulation circuit based on the first voltage being less than the second voltage,
an output voltage supplied to an electrical load being regulated based on comparing the first voltage to the second voltage, the primary side feedback circuit providing first feedback to the voltage regulation circuit to regulate a primary voltage in a primary side circuit, the first feedback relating to the primary voltage, the secondary side feedback circuit providing second feedback to the voltage regulation circuit to regulate the primary voltage, the second feedback relating to a secondary voltage in a secondary side circuit, and the primary side feedback circuit being different than the secondary side feedback circuit.

11. The power supply of claim 10, wherein the converter is further configured to:

selectively:

perform a primary side voltage regulation when the first voltage is greater than or equal to the second voltage, or perform a secondary side voltage regulation when the first voltage is less than the second voltage, the output voltage being regulated via the primary side voltage regulation in a different manner than via the secondary side voltage regulation.

12. The power supply of claim 10, wherein the converter is further configured to:

select a primary side voltage regulation;

detect, based on selecting the primary side voltage regulation, a signal associated with one of a primary winding or an auxiliary winding of the converter; and regulate the output voltage based on the signal associated with one of the primary winding or the auxiliary winding.

13. The power supply of claim 12, wherein the converter is further configured to:

determine that the first voltage is greater than or equal to the second voltage; and activate, based on determining that the first voltage is greater than or equal to the second voltage, a switch that permits the signal, associated with one of the primary winding or the auxiliary winding, to be used to regulate the output voltage.

14. The power supply of claim 10, wherein the converter is further configured to:

select a secondary side voltage regulation;

detect, based on selecting the secondary side voltage regulation, a signal associated with a secondary winding of the converter; and regulate the output voltage based on the signal associated with the secondary winding.

15. The power supply of claim 14, wherein the converter is further configured to:

determine that the first voltage is less than the second voltage; and activate, based on determining that the first voltage is less than the second voltage, a switch that permits the signal, associated with the secondary winding, to be used to regulate the output voltage.

16. The power supply of claim 10, wherein the converter is further configured to:

supply a current to a peripheral circuit, coupled to the selector pin, to generate the first voltage at the selector pin, the first voltage generated by the current being based on a type of the peripheral circuit.

17. The power supply of claim 16, wherein the type of the peripheral circuit includes one of:

a first type of circuit to provide loop compensation when performing a primary side voltage regulation, or a second type of circuit that provides third feedback for performing a secondary side voltage regulation.

18. A method, comprising:

determining, by a power supply circuit, a pin voltage at a pin;

comparing, by the power supply circuit, the pin voltage to a threshold voltage; and selectively:

connecting, by the power supply circuit and using a selection circuit, a primary side feedback circuit to a voltage regulation circuit based on the pin voltage satisfying the threshold voltage, or connecting, by the power supply circuit and using the selection circuit, a secondary side feedback circuit to the voltage regulation circuit based on the pin voltage not satisfying the threshold voltage, an output voltage supplied to an electrical load being regulated based on comparing the pin voltage to the threshold voltage, the primary side feedback circuit providing first feedback to the voltage regulation circuit to regulate a primary voltage in a primary side circuit, the first feedback relating to the primary voltage, the secondary side feedback circuit providing second feedback to the voltage regulation circuit to regulate the primary voltage, the second feedback relating to a secondary voltage in a secondary side circuit, and the primary side feedback circuit being different than the secondary side feedback circuit.

19. The method of claim 18, further comprising:

selectively:

performing a primary side voltage regulation when the pin voltage satisfies the threshold voltage, or performing a secondary side voltage regulation when the pin voltage does not satisfy the threshold voltage, the output voltage being regulated via the primary side voltage regulation in a different manner than via the secondary side voltage regulation.

20. The method of claim 18, further comprising:

determining whether the pin voltage is greater than the threshold voltage; and performing a primary side voltage regulation based on determining whether the pin voltage is greater than the threshold voltage.

21. The method of claim 18, further comprising:

determining whether the pin voltage is less than the threshold voltage; and performing a secondary side voltage regulation based on determining whether the pin voltage is less than the threshold voltage.

22. The method of claim 18, further comprising:

selecting a primary side voltage regulation; and activating, based on selecting the primary side voltage regulation, a switch that couples the primary side feedback circuit to the voltage regulation circuit, the primary voltage being a voltage associated with one of a primary winding or an auxiliary winding, and the switch, the primary side feedback circuit, and the voltage regulation circuit being included in the power supply circuit.

23. The method of claim 18, further comprising:

selecting a secondary side voltage regulation; and activating, based on selecting the secondary side voltage regulation, a switch that couples the secondary side feedback circuit, to the voltage regulation circuit, the primary voltage being a voltage associated with one of a primary winding or an auxiliary winding, the secondary voltage being a voltage associated with a secondary winding, and the switch, the secondary side feedback circuit, and the voltage regulation circuit being included in the power supply circuit.

24. The method of claim 18, further comprising:

detecting startup of the power supply circuit; and activating a switch, that causes a current to be supplied to the pin, based on detecting startup of the power supply circuit; and wherein determining the pin voltage comprises:

determining the pin voltage based on the current.

25. A converter comprising:

a voltage regulation circuit;

a first feedback circuit that provides first feedback to the voltage regulation circuit to regulate a primary voltage in a primary side circuit, the first feedback relating to the primary voltage for a primary side voltage regulation;

a second feedback circuit that provides second feedback to the voltage regulation circuit to regulate the primary voltage, the second feedback relating to a secondary voltage in a secondary side circuit for a secondary side voltage regulation, and the first feedback circuit being different than the second feedback circuit; and a mode selection circuit that includes a selector pin, the mode selection circuit being configured to:

switch between selection of a primary side voltage regulation mode and a secondary side voltage regulation mode based on whether a pin voltage at the selector pin satisfies a threshold voltage, and selectively:

cause the first feedback circuit to be connected to the voltage regulation circuit and cause the second feedback circuit to be disconnected from the voltage regulation circuit based on the pin voltage satisfying the threshold voltage, or cause the second feedback circuit to be connected to the voltage regulation circuit and cause the first feedback circuit to be disconnected from the voltage regulation circuit based on the pin voltage not satisfying the threshold voltage.

26. The converter of claim 25, wherein the mode selection circuit is further configured to:

detect the pin voltage based on a peripheral circuit coupled to the selector pin, and supply a current to the peripheral circuit, through the selector pin, such that the pin voltage is generated at the selector pin.

* * * * *